United States Patent
Winterowd et al.

(10) Patent No.: US 12,247,398 B2
(45) Date of Patent: Mar. 11, 2025

(54) CUP-RESISTANT ROOF COVERBOARD PANELS

(71) Applicant: Continuus Materials Intellectual Property, LLC, The Woodlands, TX (US)

(72) Inventors: Jack G. Winterowd, Puyallup, WA (US); Matthew Spencer, Palatine, IL (US); Marko Suput, Lompoc, CA (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 146 days.

(21) Appl. No.: 18/129,225

(22) Filed: Mar. 31, 2023

(65) Prior Publication Data

US 2024/0102288 A1 Mar. 28, 2024

Related U.S. Application Data

(60) Provisional application No. 63/408,913, filed on Sep. 22, 2022.

(51) Int. Cl.
| | |
|---|---|
| *B32B 37/14* | (2006.01) |
| *B27N 3/06* | (2006.01) |
| *B29C 65/48* | (2006.01) |
| *B29C 65/66* | (2006.01) |
| *E04D 3/34* | (2006.01) |
| *B29C 65/00* | (2006.01) |

(Continued)

(52) U.S. Cl.
CPC ............ *E04D 3/34* (2013.01); *B29C 65/4815* (2013.01); *B29C 65/66* (2013.01); *B32B 37/144* (2013.01); *B27N 3/06* (2013.01); *B29C 66/73715* (2013.01); *B29L 2031/108* (2013.01); *B32B 7/028* (2019.01); *B32B 7/12* (2013.01); *B32B 2037/1223* (2013.01); *B32B 2250/03* (2013.01); *B32B 2307/736* (2013.01); *B32B 2419/06* (2013.01)

(58) Field of Classification Search
CPC ..... B32B 2419/06; B32B 37/144; B27N 3/24; B27N 3/06; B29C 66/73715
See application file for complete search history.

(56) References Cited

U.S. PATENT DOCUMENTS

| | | | |
|---|---|---|---|
| 11,060,290 B1 | 7/2021 | Raymna, Jr. et al. | |
| 2014/0199558 A1* | 7/2014 | Pervan | E04C 2/246 |
| | | | 428/530 |

FOREIGN PATENT DOCUMENTS

| | | |
|---|---|---|
| EP | 0 676 996 B1 | 10/1995 |
| EP | 0 854 250 B1 | 7/1998 |
| EP | 0 993 935 B1 | 4/2000 |

OTHER PUBLICATIONS

Foreign Action other than Search Report on CA Dtd Aug. 29, 2024, pp. 1-4.

* cited by examiner

*Primary Examiner* — Scott W Dodds
(74) *Attorney, Agent, or Firm* — FOLEY & LARDNER LLP

(57) ABSTRACT

A method may include placing a bottom facer on a conveyor, placing a core layer on the bottom facer placing a top facer on the core layer, and pressing the bottom facer, the core layer, and the top facer in a hot press to form a panel, wherein the hot press causes the bottom facer to shrink relative to the top facer, introducing a warp into the panel such that, when installed, the warp compensates for an installation warp and the panel is flat upon installation.

6 Claims, 3 Drawing Sheets

(51) Int. Cl.
*B29L 31/10* (2006.01)
*B32B 7/028* (2019.01)
*B32B 7/12* (2006.01)
*B32B 37/12* (2006.01)

CUP-RESISTANT ROOF COVERBOARD PANELS

CROSS-REFERENCE TO RELATED PATENT APPLICATION

This application claims the benefit under 35 U.S.C. § 119(e) of U.S. provisional application No. 63/408,913, entitled "CUP-RESISTANT ROOF COVERBOARD PANELS," filed Sep. 22, 2022, which is incorporated herein by reference in its entirety.

BACKGROUND

Low slope commercial roofs generally include four layers. The base of the roof may is a fluted steel deck. A rigid insulating foam board, such as polyisocyanurate foam board or expanded polystyrene, is installed directly over the deck. A protective coverboard is positioned directly over the insulating foam and is typically secured with screws that extend through the insulating foam and into the deck. A water-resistant membrane is then installed over the protective coverboard and is attached to the coverboard with either adhesives or mechanical fasteners. The protective coverboard may warp or cup during installation, preventing proper installation of the membrane and/or impeding flow of water off of the roof.

SUMMARY

Aspects of the present disclosure are directed to a method including placing a bottom facer on a conveyor, placing a core layer on the bottom facer, placing a top facer on the core layer, and pressing the bottom facer, the core layer, and the top facer in a hot press to form a panel such that the bottom facer shrinks relative to the top facer, introducing a warp into the panel such that, when installed, the warp compensates for an installation warp and the panel may be flat upon installation.

In the method, the installation warp may be based on expected fastening sites. In the method, the installation warp may be greater with the expected fastening sites in a field region of the panel than with the expected fastening sites in a perimeter region of the panel. In the method, pressing the bottom facer, the core layer, and the top facer in the hot press may include pressing the bottom facer, the core layer, and the top facer to thermally fuse a mixture of paper fragments and plastic fragments in the core layer. In the method, the warp may have a first direction opposite a second direction of the installation warp. In the method, the bottom facer may have an unconstrained shrinkage level of greater than 1%. In the method, the bottom facer layer may be a synthetic polymer sheet good.

Aspects of the present disclosure are directed to a coverboard including a top facer, a core layer, a bottom facer, wherein the coverboard may be formed in a hot press which causes the bottom facer to shrink relative to the top facer, introducing a warp into the coverboard such that when installed, the warp compensates for an installation warp such that the coverboard may be flat upon installation.

The bottom facer may be attached to the core layer using a thermoplastic adhesive. The installation warp may be greater with expected fastening sites in a field region of the panel than with the expected fastening sites in a perimeter region of the panel. The warp may have a first direction opposite a second direction of the installation warp. The bottom facer may have an unconstrained shrinkage level of greater than 1%. The bottom facer layer may be a synthetic polymer sheet good. The bottom facer layer may have a melt-point greater than 350° F.

Aspects of the present disclosure are directed to a coverboard including a top facer, a core layer, and a bottom facer, wherein the coverboard may be warped such that when installed, a warp of the coverboard compensates for an installation warp such that the coverboard may be flat upon installation.

The bottom facer may be attached to the core layer using a thermoplastic adhesive. The installation warp may be greater with expected fastening sites in a field region of the panel than with the expected fastening sites in a perimeter region of the panel. The warp may have a first direction opposite a second direction of the installation warp. The bottom facer layer may be a synthetic polymer sheet good. The bottom facer layer may have a melt-point greater than 350° F.

Figure 1:
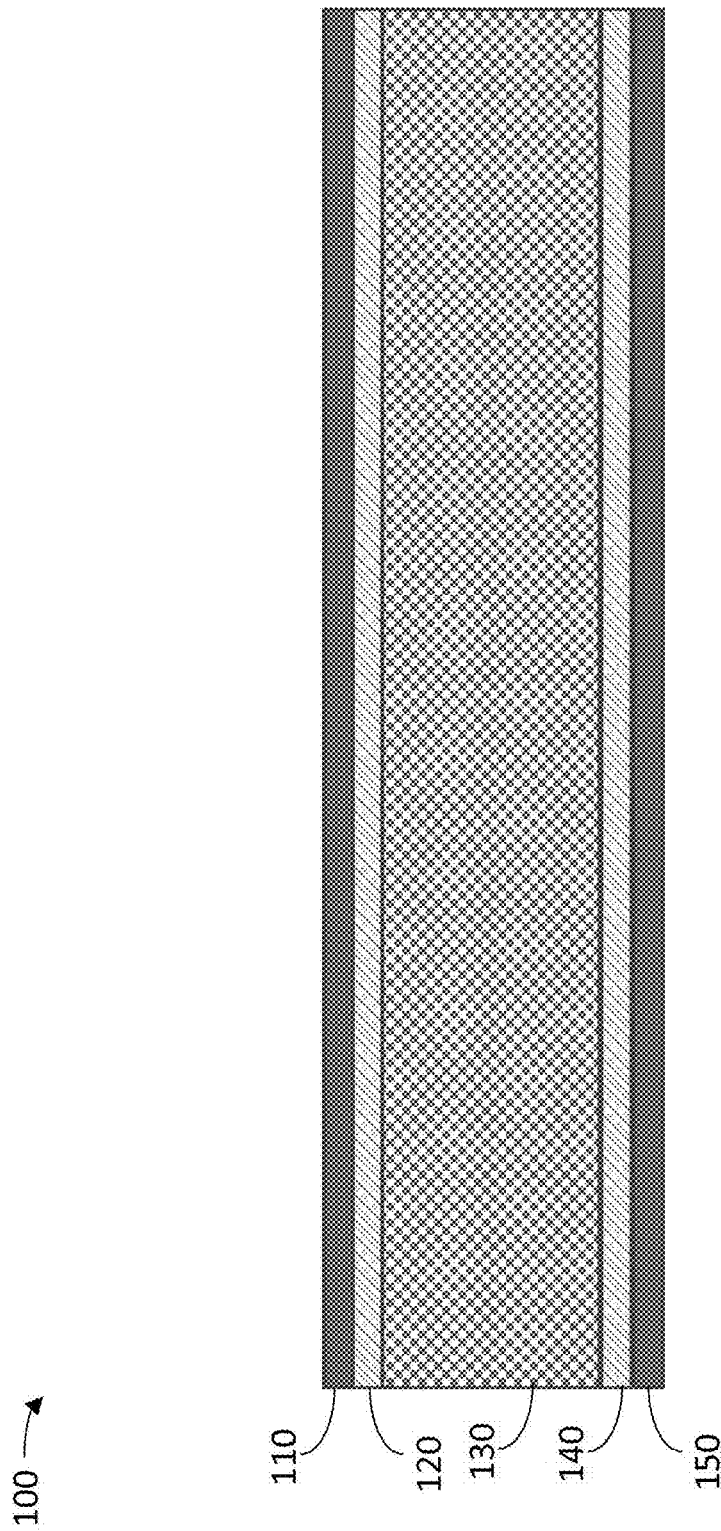
FIG. 1 illustrates an example coverboard.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

This disclosure relates to flexible composite panels having facer layers on the top and bottom major surfaces. For example, roof coverboard panels made by CONTINUUS MATERIALS have relatively low bending modulus values and can include a nonwoven fiberglass mat on the top major surface (see U.S. Pat. No. 11,060,290). Compositions of this type can have exceptional impact resistance, which makes them ideal for roof coverboard applications where resistance to hail is required. Likewise, these flexible panels can conform to irregular sub-structures, such as those found along the perimeter of low-slope roofs.

Commercial roofs can be classified as either "low slope" or "steep slope". Low slope roofs have a pitch that is less than 25%. Most low slope roofs have a pitch of only 2%, Steep slope roofs have a pitch that is greater than 25%. Low slope roofs experience greater exposure to slow-draining water, more direct impact to hail stones, and greater foot-traffic.

Low slope commercial roofs generally include four layers. The base of the assembly is typically a fluted steel deck. Less frequently, oriented strand board (OSB), plywood, or concrete are used as decking. A rigid insulating foam board, such as polyisocyanurate foam board or expanded polystyrene, is installed directly over the deck. A protective coverboard is positioned directly over the insulating foam and is typically secured with screws that extend through the insulating foam and into the deck. A water-resistant membrane is then installed over the protective coverboard and is attached to the coverboard with either adhesives or mechanical fasteners.

Additional layers are sometimes incorporated into low slope roof assemblies. In many cases an air and vapor barrier, such as polyethylene film (6 mil thick) is installed between the deck and the insulating foam. In some cases, rock ballast or concrete pavers can be placed between the insulating foam and the coverboard.

Many different membrane types can be used for low slope roofs. Common membranes include thermoplastic olefin (TPO), polyvinyl chloride (PVC), and built-up membrane roofing (BUR). TPO is generally comprised of a mixture of polyolefin (either polyethylene or polypropylene), dispersed rubber, and dispersed inorganic filler, such as talc or wollastonite. PVC membranes are most commonly plasticized polyvinyl chloride. BUR is typically based on alternating layers of asphalt and fiberglass felt. Bitumen is used to attach the BUR to the coverboard. Modified bitumen (MB), thermoplastic single-ply membranes (polyvinyl chloride, thermoplastic polyolefin, polymers based on ketone ethylene ester) or thermoset single-ply membranes (including polymers based on ethylene propylene diene monomer) are also used as membranes. Yet another membrane type is mesh-reinforced membrane coating (MREC), which is based on alternating layers of acrylic elastomeric resin and polyester reinforcing mat. In many cases, these membranes are coated on the back side with an adhesive, but they can also be held in place with mechanical fasteners or ballast. In some cases, solvent-based synthetic rubber adhesives or polyurethane adhesives are applied to the coverboard just prior to membrane installation. Sprayed polyurethane foam (2-component) is also used as a membrane. The polyurethane membrane bonds to coverboard as it cures, which eliminates the need for adhesives or mechanical fasteners.

One of the primary functions of a low-slope roof is to effectively promote drainage of rainwater. Thus, low-slope roofs include one or more drains. The drain entry points in these roofs are commonly at an elevation that is just slightly below that of the roof membrane. It therefore becomes critical that components within the roof system are shaped and installed in a manner that ensures that water can flow, in a downhill manner, or at worst, a flat manner, towards the drain openings. Roof coverboard panels that exist in a cupped state after installation could potentially alter the targeted topography and promote the formation of puddles on the roof after rain events. Puddles substantially extend the time that the roof system is in contact with water, and thus increase the cumulative environmental stress on the roof. Flat, as opposed to cupped, roof coverboards also facilitate fast and easy installation of the membrane on the top side of the coverboard. Consequently, it is very important for the roof coverboard to exist in a flat, not cupped, state after installation.

Another primary function of the roof coverboard is to protect the insulating foam, installed directly beneath it, from mechanical damage. In the absence of the coverboard, the insulating foam could easily be damaged by hail stones, foot traffic, construction activity on the roof, or other events.

Historically, roof coverboard products have included gypsum and cement-based panels. Gypsum panels are broadly used in commercial and residential construction. For interior applications, where panels are maintained in a dry state, a type of gypsum with paper outer layers can be used. For exterior applications, including those associated with potential exposure to precipitation, a type of gypsum with outer layers of nonwoven fiberglass mat is typically used. The nonwoven fiberglass mat may be made from short glass fibers and binders, such as acrylic resins, thermosetting resins, or mixtures of acrylic resins and thermosetting resins. Compared to paper, the nonwoven fiberglass mat is much more resistant to water. Due to the risk of water exposure, especially during the installation process, roof coverboards often include an outer layer of nonwoven fiberglass mat on at least a top major surface of the coverboard panel.

Nonwoven fiberglass mat can be relatively expensive. For instance, the cost of nonwoven fiberglass mat can be much more expensive than that of kraft paper. Furthermore, handling panels with nonwoven fiberglass mat facers during the installation process can be uncomfortable due to the tendency of installers to experience small slivers of glass that become embedded in the skin on their hands. For these reasons, and others, roof coverboard panels can be manufactured with paper facers. Thus, paper facers can be used on one major surface of the panel, such as the bottom major surface, or alternatively, paper facers can be used on the top and bottom major surfaces of the panel.

Roof coverboards can be made with nonwoven fiberglass mat on the top major surface, where exposure to precipitation during installation is most likely, and these same panels can utilize paper facer on the bottom major surface of the panel. This combination of facer materials can achieve a good balance between cost, water resistance, and handling comfort. That said, the use of different facer materials on the top and bottom major surfaces of the coverboard can be risky, as this can promote warpage or cupping in panels, especially thin panels.

It is common for builders to attach the roof coverboard through the insulating foam to the structural deck with mechanical fasteners (long screws) in a limited number of locations, such as 6, 8 or 12 locations in the field region of the panel. These fastening locations often do not include the panel edges and corners. This fastening schedule is fast and convenient for the installer and satisfies structural requirements of the roof system. Unfortunately, the foam directly beneath the coverboard is somewhat compressible. Thus, there is a tendency for a field region of the panel to be pulled to a slightly lower elevation than the edges and corners of the panel. Consequently, the fastening process tends to induce warpage or cupping in the coverboard panel. In some cases, the elevation of the top major surface of the panel at a field location can be as much as about 0.150" lower than the top major surface of the panel at a corner location. Thus, installed coverboard panels can have edges and or corners that are raised upwards relative to the rest of the panel.

Conventional roof coverboards can be susceptible to the cupping problem. As previously stated, installed coverboard panels that are warped or cupped adversely impact the process of membrane installation and can also result in an irregular topography on the finished roof, which contradicts effective drainage of rainwater.

The current disclosure solves the technical problem of warping in roof coverboards. Pre-warping coverboards to compensate for expected warping during installation allows coverboards to be flat upon installation, greatly simplifying the installation process and improving the quality of a roof. Pre-warping coverboards to result in flat installed coverboards results in easier, faster, and safer membrane installation. Forming a board with imbalanced surface layers having different levels of shrinkage during heating provides the technical advantage of a consistent, scalable, and efficient method for producing pre-warped coverboards. Using the different levels of shrinkage during heating of the imbalanced surface layers allows for the coverboards to be pre-warped as part of a forming process of the board, providing the technical advantage of a simple, integrated process for producing pre-warped coverboards.

Embodiments of the present disclosure relate to a coverboard. The coverboard uses an approach of imbalanced panel design, which is highly unconventional for the purpose of correcting problems related to cupping or warping. The coverboard achieves a flat condition subsequent to installation, even when the coverboard is installed with fasteners used exclusively in a field region of the coverboard. The coverboard includes one major surface that is designated as the top major surface during the installation process, and a second major surface that is designated as the bottom major surface during the installation process. A core layer exists between the top and bottom major surfaces. In some embodiments, the coverboard includes a glass fiber fabric on the top major surface and a synthetic polymer sheet good with a melting temperature that is greater than about 350° F. on the bottom major surface.

FIG. 1 illustrates an example coverboard 100. The coverboard 100 may include a top facer 110, a top adhesive 120, a core layer 130, a bottom adhesive 140, and a bottom facer 150. The top facer 110 may be a top surface of the coverboard when the coverboard is installed. In some embodiments, the top facer 110 may be attached to the core layer 130 by the top adhesive 120 and the bottom facer 150 may be attached to the core layer 130 by the bottom adhesive 140. The top adhesive 120 and the bottom adhesive 140 may include a thermosetting adhesive, a thermoplastic adhesive, a polyethylene film, a polypropylene film, or any type of adhesive or combination of adhesives. In other embodiments, the top facer 110 and the bottom facer 150 may be attached to the core layer 130 using mechanical fasteners or other attachment means and the coverboard 100 may omit the top adhesive 120 and the bottom adhesive 140.

The core layer 130 may include a variety of materials or combinations of materials. In some embodiments, the core layer 130 may include an inorganic material, such as gypsum, magnesium oxide, or Portland cement. In some embodiments, the inorganic material may be fortified with fibers or other additives. In other embodiments, the core layer may include wood, such as plywood, oriented strandboard, fiberboard, or particleboard.

In yet other embodiments, the core layer may include a thermally-fused mixture of paper fragments and plastic fragments. Paper and plastic fragments may be shaped as irregular plates. In some embodiments, the paper and plastic fragments may have a diameter of about 0.010-2.000" and a thickness of about 0.005-0.050". Paper fragments can be made by milling pieces of paper until the milled material passes a screen with a particular mesh size. Paper subjected to the milling process can be newspaper, advertising, office paper, packaging, or other paper products. The paper may be virgin material, it may be recycled or sourced from waste streams, or it may be a combination of both. Generating paper fragments from waste or recycling streams has the advantage of being low cost and helps to resolve a world-wide sustainability problem. In some embodiments, the paper fragments have a thickness and diameter of less than about 0.020" may be used.

The plastic fragments may include polypropylene, polystyrene, polyester, nylon, rubber (natural and synthetic), polyvinyl chloride, polyethylene (including LLDPE, LDPE, MDPE, HDPE), copolymers of ethylene and propylene, other commercial plastics, or any other plastic. In some embodiments, polyethylene based plastics, especially low and medium density polyethylene resins, may be used. The plastic fragments may be a mixture of different types of polymers. In some embodiments, the plastic may contain plasticizers, such as dioctyl phthalate or benzyl butyl phthalate, colorants, stabilizers, preservatives, and other functional additives. The plastic fragments may be prepared by milling pieces of plastic. The plastic may be virgin film material, it can be recycled or sourced from waste streams (films, packaging, or a wide array of plastic articles), or the plastic may be a combination of both. Generating plastic fragments from waste or recycling streams has the advantage of being low cost and helps to resolve a world-wide sustainability problem. In some embodiments, plastic fragments having a thickness and a diameter of less than about 0.020" may be used.

In some embodiments, individual fragments may include both paper and plastic. For example, many packaging materials found in waste streams include a plurality of alternating paper and plastic layers. In some cases, these packaging materials may include a layer of aluminum foil or a film that has been metalized on one surface. In some embodiments, fragments derived from all of these materials may be used.

In some embodiments, the core layer 130 may have a thickness ranging from about 0.1-1.0 inches. In some embodiments, the core layer 130 may have a thickness of about 0.20-0.60 inches. In some embodiments, the core layer 130 may have a density of about 15-75 pounds per cubic foot (PCF). In some embodiments, the core layer 130 may have a density of about 28-65 PCF.

The top facer 110 may include a glass fiber fabric including glass fibers. In some embodiments, the glass fiber fabric may be a nonwoven fiberglass mat. In other embodiments, the glass fiber fabric may be a woven glass fiber mat. A thickness of the glass fiber fabric may be about 0.005-0.100 inches.

The bottom facer 150 may be a synthetic polymer sheet good with a melt-point that is greater than about 350° F. Furthermore, the bottom facer can also have a shrinkage level (unconstrained) when heated to a temperature of about 300-450° F. of greater than about 1%. In some embodiments, the synthetic polymer sheet good may be a polyester film. In other embodiments, the synthetic polymer sheet good may be a nylon film. In yet other embodiments, the synthetic polymer sheet good may be a spunbond polyester nonwoven. In yet other embodiments, the synthetic polymer sheet good may be a spunbond nylon nonwoven. In some embodiments, a thickness of the bottom facer 150 may be about 0.0005-0.100 inches. In some embodiments, the bottom facer 150 may be a multi-layered material as long as one of the layers is a synthetic polymer with a melt-point that is greater than about 350° F.

In some embodiments, the top facer 110 and the bottom facer may be any materials or combination of materials having different shrinkage levels when heated such that the top facer 110 has a lower shrinkage level than that of the bottom facer 150. In some embodiments, a material of the top facer 110 and a material of the bottom facer 150 may be selected such that the coverboard 100 has a target amount of warping before installation. In other embodiments, a shrinkage level of the top facer and a shrinkage level of the bottom facer 150 may be selected such that the coverboard 100 has the target amount of warping before installation. The target amount of warping may be such that the coverboard 100 is flat upon installation. For example, the target amount of warping may be equal to an installation amount of warping introduced during installation such that the target amount of warping and the installation amount of warping cancel each other out, resulting in the coverboard 100 being flat upon installation. The target amount of warping may be in a direction and curve opposite the installation amount of warping such that the coverboard 100 is flat upon installation.

Figure 2:
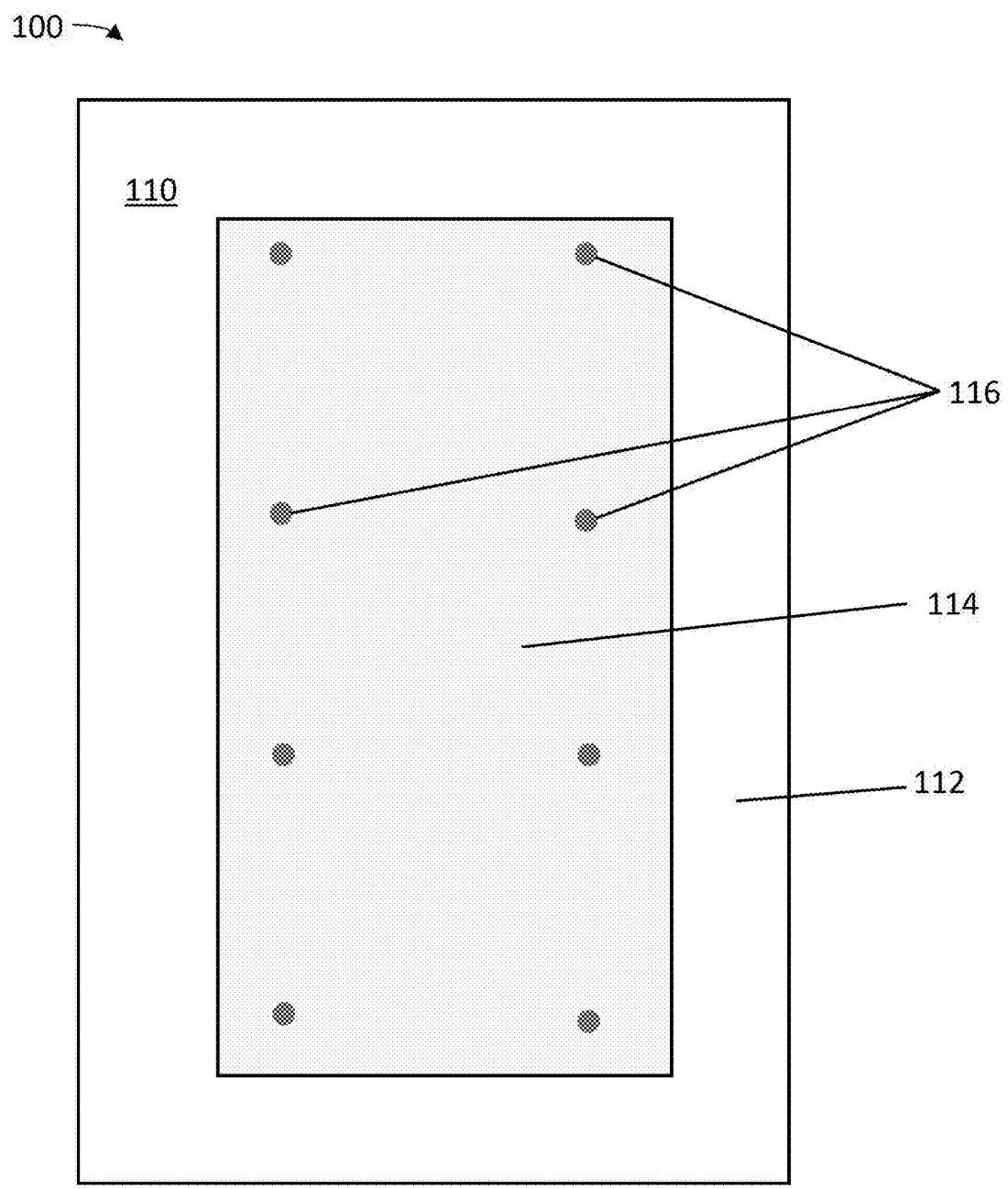
FIG. 2 is a top view of the example coverboard of FIG. 1.

FIG. 2 is a top view of the example coverboard 100 of FIG. 1. The top facer 110 may include a perimeter region 112, a field region 114, and fastening sites 116. The fastening sites 116 may be located in the field region 114. The fastening sites 116 are example fastening sites and are provided for illustration purposes only. The fastening sites 116 may include more or fewer fastening sites than shown. The fastening sites 116 may be locations where the coverboard 100 is attached to a roof using fasteners. For example, the fastening sites 116 may be location where screws are driven through the coverboard 100 to attach the coverboard 100 to the roof. Fastening the coverboard 100 to the roof at the fastening sites 116 may warp the coverboard 100. The coverboard 100 may be pre-warped to compensate for installation warp introduced by fastening the coverboard 100 to the roof, as discussed herein.

The coverboard 100 may be warped more or less during installation depending on locations of the fastening sites 116. For example, the coverboard 100 may be warped more when the fastening sites 116 are within the field region 114 than when the fastening sites 116 are within the perimeter region 112. The pre-warping of the board may be adjusted based on expected locations of the fastening sites 116. The expected locations of the fastening sites 116 may depend upon an expected use of the coverboards.

The coverboard 100 may be warped more or less during installation depending on a composition of the coverboard 100. For example, the coverboard 100 may be warped more when the core layer 130 is a thermally-fused blend of paper and plastic fragments than when the core layer 130 is wood.

Figure 3:
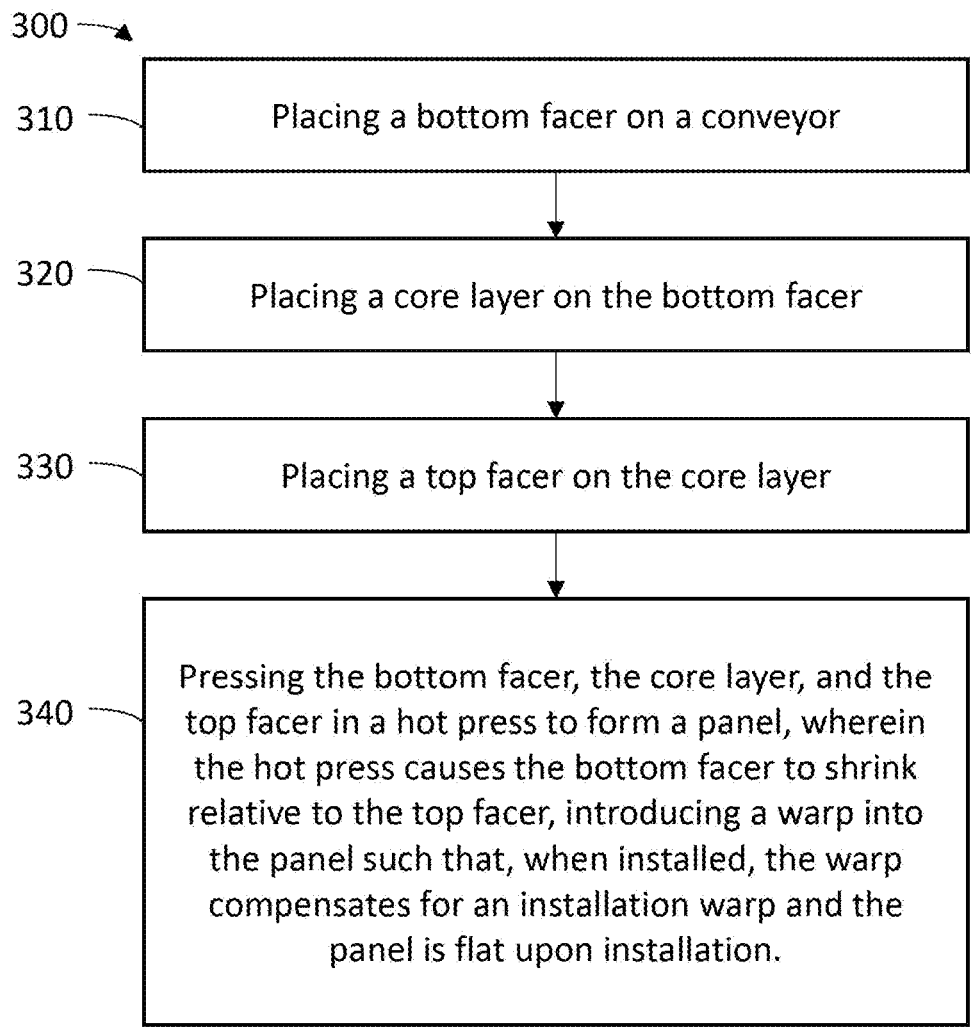
FIG. 3 is a flow chart illustrating operations for manufacturing a coverboard panel.

FIG. 3 is a flow chart 300 illustrating operations for manufacturing a coverboard panel. The operations shown may include additional, fewer, or different operations. Additionally, the operations may be performed in the order shown, a different order, or concurrently.

At 310, a bottom facer is placed on a conveyor. The conveyor may be a conveyor for manufacturing the coverboard panel. The conveyor may be used to manufacture a continuous sheet which is cut into individual coverboard panels. The bottom facer may be a synthetic polymer sheet good with a melt-point that is greater than about 350° F. Furthermore, the bottom facer can also have a shrinkage level (unconstrained) when heated to a temperature of about 300-450° F. of greater than about 1%. In some embodiments, the synthetic polymer sheet good may be a polyester film. In other embodiments, the synthetic polymer sheet good may be a nylon film. In yet other embodiments, the synthetic polymer sheet good may be a spunbond polyester nonwoven. In yet other embodiments, the synthetic polymer sheet good may be a spunbond nylon nonwoven. In some embodiments, a thickness of the bottom facer may be about 0.0005-0.100 inches. In some embodiments, the bottom facer may be a multi-layered material as long as one of the layers is a synthetic polymer with a melt-point that is greater than about 350° F.

At 320, a core layer is placed on the bottom facer. In some embodiments, an adhesive is placed between the bottom facer layer and the core layer. The adhesive may be a thermosetting adhesive, a thermoplastic adhesive, a polyethylene film, a polypropylene film, or any type of adhesive or combination of adhesives. In some embodiments, placing the core layer on the bottom facer includes dispensing a predetermined ratio of paper fragments on the bottom facer layer. The paper and plastic fragments may be shaped as irregular plates. In some embodiments, the paper and plastic fragments may have a diameter of about 0.010-2.000" and a thickness of about 0.005-0.050".

Paper fragments can be made by milling pieces of paper until the milled material passes a screen with a particular mesh size. Paper subjected to the milling process can be newspaper, advertising, office paper, packaging, or other paper products. The paper may be virgin material, it may be recycled or sourced from waste streams, or it may be a combination of both. Generating paper fragments from waste or recycling streams has the advantage of being low cost and helps to resolve a world-wide sustainability problem. In some embodiments, the paper fragments have a thickness and diameter of less than about 0.020" may be used.

The plastic fragments may include polypropylene, polystyrene, polyester, nylon, rubber (natural and synthetic), polyvinyl chloride, polyethylene (including LLDPE, LDPE, MDPE, HDPE), copolymers of ethylene and propylene, other commercial plastics, or any other plastic. In some embodiments, polyethylene based plastics, especially low and medium density polyethylene resins, may be used. The plastic fragments may be a mixture of different types of polymers. In some embodiments, the plastic may contain plasticizers, such as dioctyl phthalate or benzyl butyl phthalate, colorants, stabilizers, preservatives, and other functional additives. The plastic fragments may be prepared by milling pieces of plastic. The plastic may be virgin film material, it can be recycled or sourced from waste streams (films, packaging, or a wide array of plastic articles), or the plastic may be a combination of both. Generating plastic fragments from waste or recycling streams has the advantage of being low cost and helps to resolve a world-wide sustainability problem. In some embodiments, plastic fragments having a thickness and a diameter of less than about 0.020" may be used.

In some embodiments, individual fragments may include both paper and plastic. For example, many packaging materials found in waste streams include a plurality of alternating paper and plastic layers. In some cases, these packaging materials may include a layer of aluminum foil or a film that has been metalized on one surface. In some embodiments, fragments derived from all of these materials may be used. The core layer may include a variety of materials or combinations of materials. In some embodiments, the core layer may include an inorganic material, such as gypsum, magnesium oxide, or Portland cement. In some embodiments, the inorganic material may be fortified with fibers or other additives. In other embodiments, the core layer may include wood, such as plywood, oriented strandboard, fiberboard, or particleboard.

In some embodiments, the core layer may have a thickness ranging from about 0.1-1.0 inches. In some embodiments, the core layer may have a thickness of about 0.20-0.60 inches. In some embodiments, the core layer may have a density of about 15-75 pounds per cubic foot (PCF). In some embodiments, the core layer may have a density of about 28-65 PCF.

At 330, a top facer is placed on the core layer. In some embodiments, the bottom facer, core layer, and top facer may be placed or otherwise disposed such that the core layer is disposed between the top facer and the bottom facer. Placing the top facer may include placing an adhesive between the core layer and the top facer. The top facer may be a glass fiber fabric including glass fibers. In some embodiments, the glass fiber fabric may be a nonwoven fiberglass mat. In other embodiments, the glass fiber fabric may be a woven glass fiber mat. A thickness of the glass fiber fabric may be about 0.005-0.100 inches. The top facer may be a top surface of the panel when installed on a roof.

At 340, the bottom facer, the core layer, and the top facer are pressed in a hot press to form a panel, wherein the hot press causes the bottom facer to shrink relative to the top facer, introducing a warp into the panel such that, when installed, the warp compensates for an installation warp and the panel is flat upon installation. The hot press may apply heat to the bottom facer, the core layer, and the top facer to cause the bottom facer to shrink. The hot press may cause a mixture of paper and plastic fragments in the core layer to thermally fuse. The hot press may apply pressure to the bottom facer, the core layer, and the top facer to form the panel. The hot press may apply a predetermined amount of heat and a predetermined amount of pressure to ensure the warp compensates for the installation warp.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Non-Limiting Examples

Example 1. A panel comprising a core layer and two major surface layers; wherein a first major surface layer is designated as the top major surface layer during an installation event, and the second major surface layer is designated as the bottom major surface layer during an installation event; wherein the top major surface layer comprises a glass fiber fabric and the bottom major surface layer comprises a synthetic polymer sheet good with a melt-point greater than about 350° F.

Example 2. The panel of example 1, wherein the top major surface layer comprises a nonwoven fiberglass mat.

Example 3. The panel of example 1, wherein the bottom major surface layer comprises a polyester film.

Example 4. The panel of example 1, wherein the bottom major surface layer comprises a nylon film.

Example 5. The panel of example 1, wherein the core layer comprises thermally fused paper and plastic fragments.

Example 6. The panel of example 1, wherein the core layer comprises wood.

Example 7. The panel of example 1, wherein the core layer comprises an inorganic cement.

Example 8. A system for constructing low-slope roofs, wherein roof coverboards comprising a glass fiber top major surface layer and a synthetic polymer sheet good bottom major surface layer are fastened in field regions of the panel and the installed panel are flat after fastening, such that the resulting roof system more effectively drains rainwater.

Example 9. A system for constructing low-slope roofs, wherein roof coverboards comprising a glass fiber top major surface layer and a synthetic polymer sheet good bottom major surface layer are fastened in field regions of the panel and the installed panel are flat after fastening, such that the installed coverboards facilitate fast, easy and proper installation of the roof membrane.

What is claimed is:

1. A method comprising:
   placing a bottom facer on a conveyor;
   placing a core layer on the bottom facer;
   placing a top facer on the core layer; and
   pressing the bottom facer, the core layer, and the top facer in a hot press to thermally fuse a mixture of paper fragments and plastic fragments in the core layer to form a panel such that the bottom facer shrinks relative to the top facer, introducing a warp into the panel such that, when installed, the warp compensates for an installation warp and the panel is flat upon installation.

2. The method of claim 1, wherein the installation warp is based on expected fastening sites.

3. The method of claim 2, wherein the installation warp is greater with the expected fastening sites in a field region of the panel than with the expected fastening sites in a perimeter region of the panel.

4. The method of claim 1, wherein the warp has a first direction opposite a second direction of the installation warp.

5. The method of claim 1, wherein the bottom facer has an unconstrained shrinkage level of greater than 1%.

6. The method of claim 1, wherein the bottom facer layer is a synthetic polymer sheet good.

* * * * *